Sept. 20, 1960  N. B. NEWTON  2,953,228
CENTRIFUGAL FRICTION CLUTCHES
Filed Sept. 5, 1956  6 Sheets-Sheet 1

Inventor
Noel B. Newton
by
Attorney

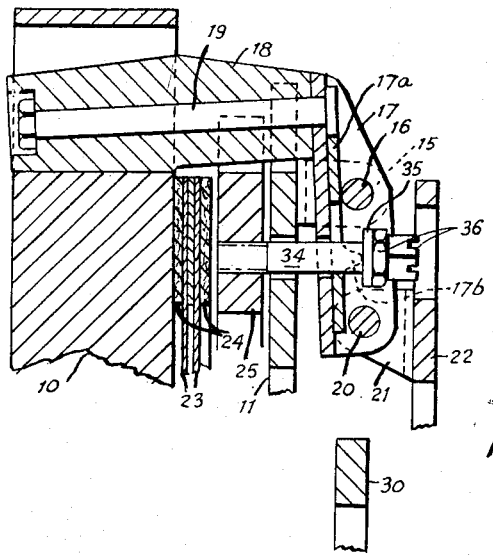
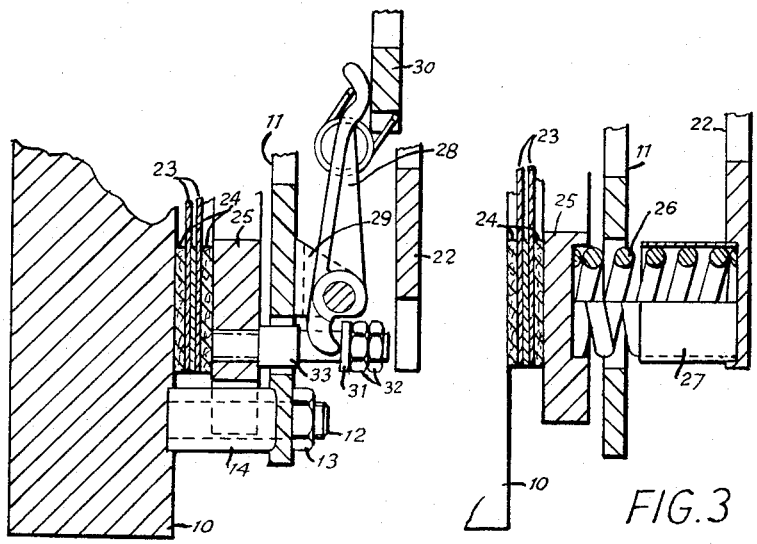

Sept. 20, 1960    N. B. NEWTON    2,953,228
CENTRIFUGAL FRICTION CLUTCHES
Filed Sept. 5, 1956    6 Sheets-Sheet 3

Inventor
Noel B. Newton
by
Attorney

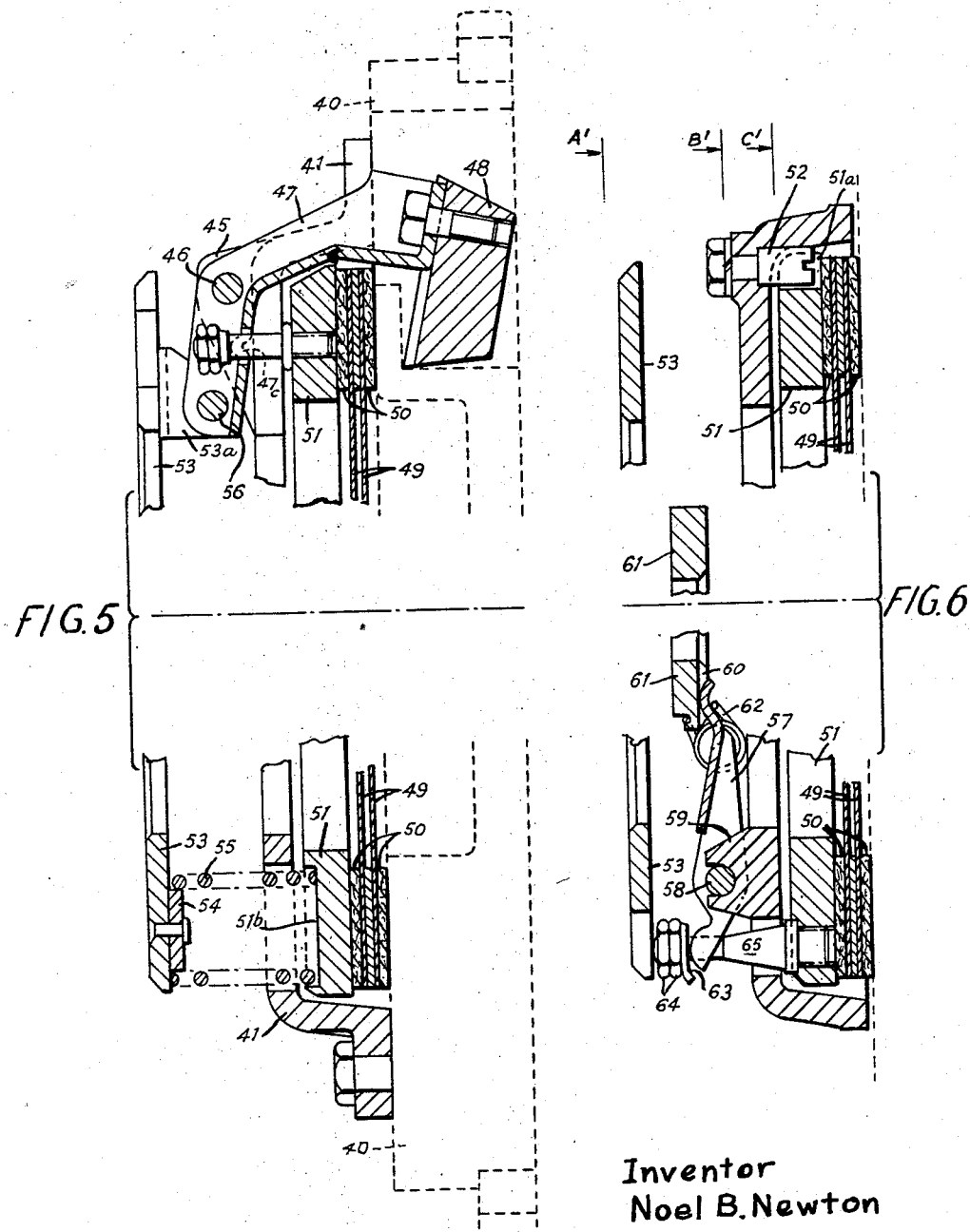

Inventor
Noel B. Newton
by
Attorney

Inventor
Noel B. Newton
by *Attorney*

United States Patent Office 2,953,228
Patented Sept. 20, 1960

2,953,228

CENTRIFUGAL FRICTION CLUTCHES

Noel Banner Newton, Ashley Green, Chesham, England, assignor to Newton & Bennett Limited, a British company Filed Sept. 5, 1956, Ser. No. 608,083

Claims priority, application Great Britain Sept. 13, 1955

11 Claims. (Cl. 192—105)

This invention relates to centrifugal friction clutches of the kind having a plurality of centrifugal actuating masses operating to transmit centrifugally generated forces through springs, hereinafter called clutch springs, to a presser plate for clutch engagement. The invention is particularly, though not exclusively, applicable to friction clutches for automobiles.

It is a requirement of such clutches that they must be free or disengaged up to a certain speed, the "tick over" speed, say 450 r.p.m. and fully loaded at the "full load" speed, say 1,000 r.p.m. or free up to say 750 r.p.m. and fully loaded at 1,500 r.p.m. To obtain this result "hold-off" springs have been provided, additional to the clutch springs, to resist the centrifugally-generated force and thereby to "hold-off" clutch engagement until the pre-determined speed is reached for the commencement of clutch engagement. These "hold-off" springs therefore always operate in opposition to the centrifugally-generated forces. What is most desired is to close the gap between the "tick over" and "full load" speeds, for example to raise the "tick-over" speed without raising the full load speed. But if, for example it is desired to raise the tick over speed from 450 to 550 r.p.m. keeping the full load speed as before say at 1,000 r.p.m., not only has one to increase appreciably the strength of the "hold-off" springs to raise the "tick over" speed but also to increase the centrifugal masses to overcome the greater hold off force at "full load" speed, which in turn means the hold off springs have to be increased to raise the "tick over" speed and so on, the one increase chasing the other virtually in a vicious circle. This tends towards producing an undesirable increase of size and weight of clutch before the desired result is achieved.

It is the object of this invention to provide a centrifugal clutch which will have advantages over the old type of clutch with "hold off" springs.

This invention consists in one aspect in a centrifugal clutch having a presser plate, a spring abutment member, a clutch spring between the presser plate and the spring abutment member, means for applying to the spring abutment member a centrifugally generated clutch-engaging force, an interconnecting lever having a first fulcrum with a driven part of the clutch and a second fulcrum with the spring abutment member and a tie member between the presser plate and a third fulcrum on the interconnecting lever located between the aforesaid first and second fulcrums, whereby the clutch spring operates through the lever to load the tie member and withdraw the presser plate and to provide a holding-off force opposed to the said clutch-engaging force until the clutch-engaging force is effective to unload the tie member and further compress the clutch spring while simultaneously disengaging the tie member from the third fulcrum.

By "presser plate" is meant the usual axially movable driving plate which is carried by the engine flywheel and is adapted to engage the friction plate driven assembly between it and the flywheel.

By "spring abutment member" is meant means through which force may be applied to the clutch spring to compress the same. It may conveniently be a spring plate or be a part integral with the interconnecting lever.

The expression "spring means" includes any resilient means and includes one or a number of springs.

The expression "fulcrum" is used to include connections by free abutment as well as those which are in tied abutment as, for example, a pivot pin.

By the expression "a driving part of the clutch" is included the flywheel or any member or any part of the engine which is connected therewith and rotates at the same speed as the driving part of the clutch.

It will be appreciated that in the above centrifugal clutch as soon as the third fulcrum is disengaged as when the clutch is in full engagement, then the whole of the compressive force is applied through the spring means.

It is preferred that there should be a number of un-jointed levers each carrying respectively at one end, one of the centrifugal masses and transmitting the centrifugal force directly to the spring abutment member.

The invention consists further in another aspect in a centrifugal clutch having at least three parts, namely, a clutch driving member, a presser plate and spring abutment member adapted to load the presser plate into clutch engagement through spring means, an interconnecting lever in fulcrum engagement with each of such parts, one of such fulcrum engagements being disengageable, the arrangement being such that the spring means is pre-stressed and operates by leverage through the interconnecting lever means, and without any reaction from any reaction point which is not on a part of the driving part of the clutch, to oppose the centrifugal loading force and hold back the presser plate from clutch engagement until the said force not only causes clutch engagement but builds up to exceed the opposing leverage whereupon the said one of such engagements becomes disengaged to allow loading of the presser plate into clutch engagement through the spring means without any leverage opposition.

It is preferred that the spring means should consist of a number of symmetrically disposed coiled springs.

It is preferred that the centrifugal masses should be located in cylindrical holes in the flywheel, the walls of which form stops limiting the outward movement of the masses and the masses being so shaped as to make line contact with such walls.

It is also preferred that means shall be provided which when operated, will render temporarily inoperative the interconnecting lower means to enable the spring means to be compressed and effect clutch engagement while the clutch is stationary.

In the accompanying drawings:

Fig. 2 is a cross-section on line 2—2 of Fig. 1 showing the presser plate withdrawn;

Fig. 2A is a cross-section on line 2A—2A of Fig. 1, showing the presser plate in a position to load the friction elements of the driven part of the clutch;

Fig. 3 is a fragmentary cross-section on line 3—3 of Fig. 1;

Fig. 5 is a cross-section of the clutch shown in Fig. 4 taken on the line 5—5 of Fig. 4 to show especially a centrifugal mass and a clutch spring, respectively in the upper and lower halves of the figure;

Fig. 6 is a cross-section on line 6—6 of Fig. 4 to show the drive for the presser plate and the clutch withdrawal mechanism, respectively in the upper and lower halves of the figure;

Figure 1:
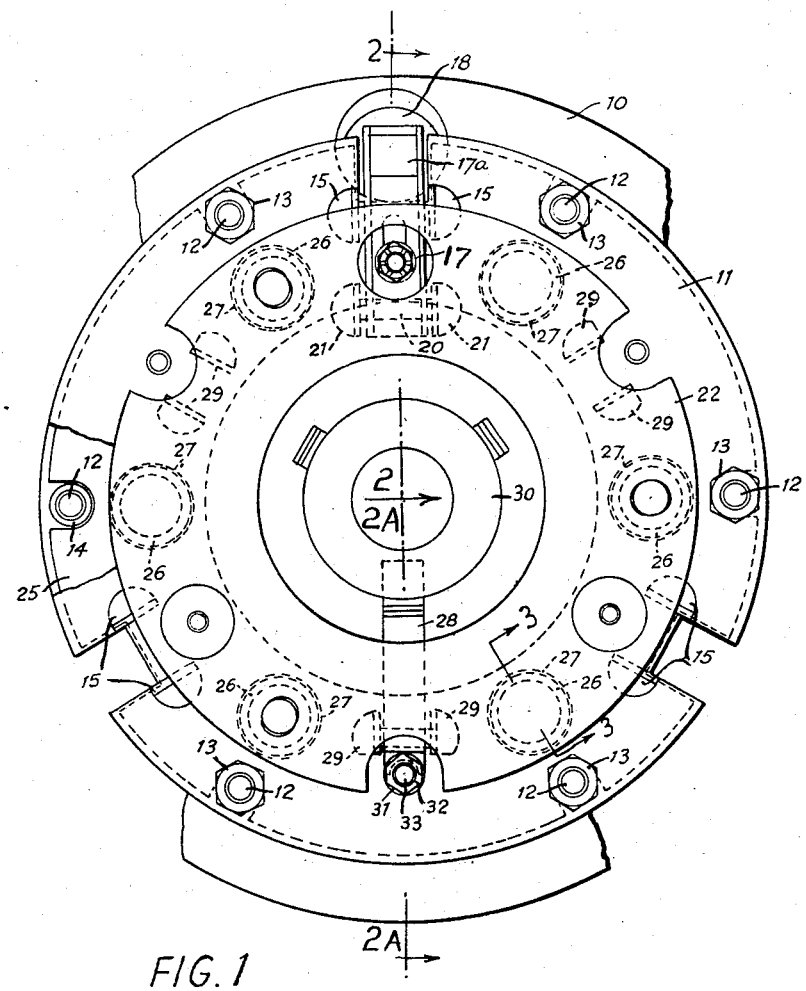
Fig. 1 is a front elevation of one example of centrifugal clutch made in accordance with the present invention.

As shown in Figs. 1 to 3 and 15 of the drawings, the clutch mechanism is mounted on a flywheel 10 and the driving part of the clutch includes a fixed plate 11 secured to the flywheel by studs 12 and nuts 13 and spaced from the flywheel by collars 14 on the studs. Attached to the outer face of the fixed plate 11 are three sets of L-shaped brackets 15 carrying pivot pins 16 for levers 17 which have centrifugal masses 18 attached to their outer ends by bolts 19. At its inner end each lever has an elongated hole for a pivot pin 20 carried by brackets 21 attached to a spring plate 22. Each lever 17 is of channel shape and slidably mounted therein is a fulcrum plate 17a (Fig. 2 upper half) having fulcrum projections 17b on each side of a centrally disposed slot in the plate 17a. A light spring 17c shown diagrammatically urges the fulcrum plate toward the axis of rotation within the limits of movement determined by the slot.

The clutch has the usual construction of driven clutch plate consisting of a center plate 23 carrying friction linings 24 and behind the fixed plate 11 is located the presser plate 25, notched in its periphery to have driving location with the collars 14. Between a spring plate 22 forming a spring abutment means and the presser plate 25 are clutch springs 26 partly housed in cups 27 (Fig. 3), secured to the spring plate 22.

Clutch withdrawal levers 28 are provided pivoted to brackets 29 attached to the fixed plate 11, the inner ends of said levers being adapted to be engaged by an actuating ring 30. The outer ends of the levers 28 are bifurcated and hook-shaped to engage collars 31 adjustably positioned by nuts 32 on studs 33 fixed in the presser plate 25. These levers are actuated by a clutch pedal or servo mechanism during gear change operation.

Also fixed in the presser plate 25 are tie members 34 carrying loose collars 35 adjustably positioned thereon by nuts 36, said collars being complementary to the fulcrum 17b. The clutch springs are normally pre-stressed by the tie members through the action of the fulcrum 17b.

It will be observed that there are means, other than the spring means, interconnecting spring plate 22 and presser plate 25, namely pivots 20 carried by brackets 21, levers 17 pivoted on pivots 20, fulcrum plates 17a each with its fulcrum projections 17b and collars 35 which engage with fulcrum projections 17b and are carried upon tie members 34.

In operation when the flywheel is stationary the movable parts will normally be in the relative positions shown with the presser plate 25 withdrawn from contact with the friction elements 24. In this position the clutch springs 26 act with differential leverage about the pivot pin 16 through the pivot pin 20 and fulcrum 17b and tie member 34 to cause withdrawal of the presser plate. When the flywheel is rotating and as centrifugal force builds up, the masses 18 move outwardly causing lever 17 to rotate in a clockwise direction, as viewed in Fig. 2, about a reaction point, pivot 16, thereby pulling through pivot 20 the spring plate 22 towards the flywheel while the time member 34 through the fulcrum 17b and collar 35 restrains the movement of the presser plate towards the driven plate though allowing it to move a lesser distance than spring plate 22, in this case about half, according to the ratio of the distance from the pivot pin 16 to the fulcrum 17b and to the pivot pin 20 respectively. This movement effects an initial compression of the pre-stressed clutch springs so that such springs therefore operate as hold-off springs to oppose the centrifugal force on the lever and thereby to delay initial clutch engagement.

In this position, which may be reached at, say, 450 r.p.m., the force of the clutch springs is distributed partly at the fulcrum 17b assisting the aforesaid movement of the lever and partly at the fulcrum 20 opposing such movement and as yet no clutch engaging force is available to press the presser plate 25 against the friction elements 24. Further movement of the lever cannot take place until at, say, 1,000 r.p.m. the centrifugal force has built up progressively loading the clutch to the point when such force applied at the fulcrum 20 is able of itself further to compress the clutch springs 26 when full clutch engagement obtains. At the instant that such further movement occurs, the fulcrum 17b disengages from the collar 35 and then the springs load the presser plate without any leverage opposition. Movement of the lever 17 is limited by engagement of the centrifugal masses 19 in a hole in the flywheel so that the presser plate cannot be overloaded.

Conversely, as the engine speed falls to, say, just above 1,000 r.p.m., the clutch springs press back the spring plate and lever 17 until the fulcrum 17b re-engages with the collar 35. No further movement of the lever occurs as the speed falls but the pressure of the presser plate 25 on the friction elements 24 falls progressively until it reaches zero while the reaction force from the clutch spring builds up at the fulcrum 17b. This occurs at 450 r.p.m. whereafter the pressure on the spring plate is diminished to zero and the clutch springs operating with mechanical leverage progressively press back the spring plate 22 and lever 17 against the force from the other end of the spring on the lever at the fulcrum 17b. In so moving the lever 17 the clutch springs withdraw the clutch plate by moving the time member 34 and also operate as return springs for the centrifugal weights.

It will be observed that the reaction point for lever 17, namely pivot 16, is carried by bracket 15, which is a part of the driving part of the clutch, and there is no reaction from any reaction point which is not a part of the driving part of the clutch. This avoids the relative movement and resulting wear which would occur if reaction were obtained from a part not part of and not moving at the same speed of rotation as the driving part of the clutch.

The relative leverage lengths between the pivots 16 and 20 and at the fulcrum 17b can be designed other than as shown, so as to obtain different values of differential leverage from the clutch springs while they are acting as "hold off" springs. Therefore, the relative speeds for "tick over" and "full load" can be adjusted in a simple manner after having determined the speed and forces for full load, merely by calculation of the leverage required.

If the clutch ring 30 is actuated while the flywheel is stationary, the collars 35 are drawn away from the fulcrum 17b and fulcrum plates 17a are pulled by light springs 17c towards the center of the clutch and out of register with said collars. When the pressure on the ring 30 is released, the clutch springs are free to advance the presser plate into contact with the friction elements 24 and a driving load is provided thereon by the clutch springs, as in an ordinary, non-centrifugal clutch. As soon as the centrifugal masses move the levers into a normal clutch-loading position, centrifugal force will return the plates 17a to their normal positions. The springs acting on the plates 17a are not strong enough to move the plates against frictional resistance normally provided by the engagement of the fulcrum 17b with its collar 35.

Figure 4:
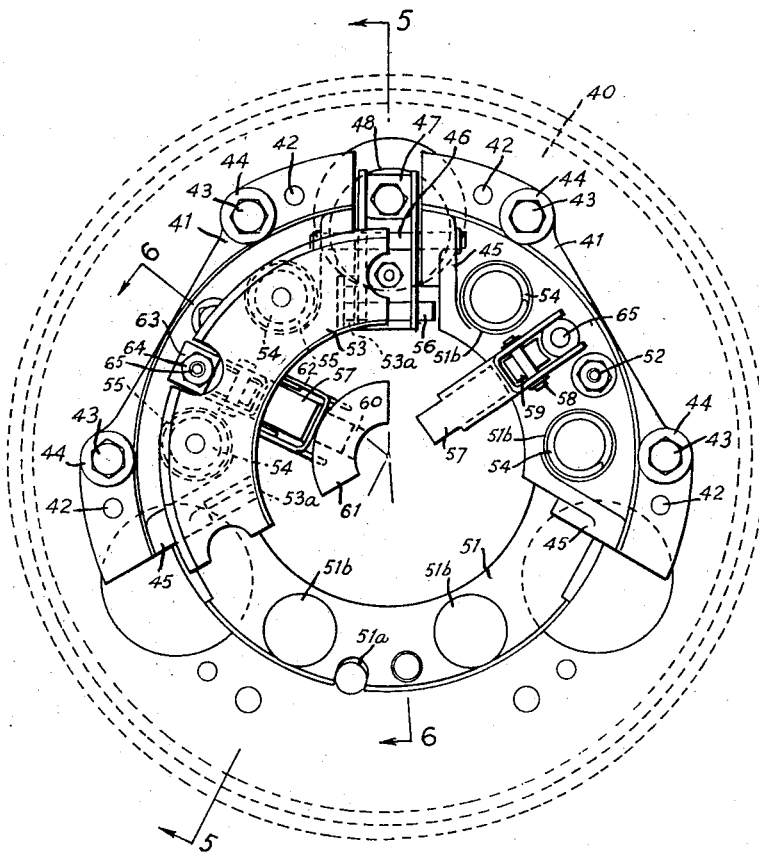
Fig. 4 is a front elevation of one example of a centrifugal clutch made in accordance with the present invention, the three sectors A, B and C being views on the lines A', B' and C' of Fig. 6.

As shown in Figs. 4 to 11 of the drawings, the clutch body is assembled against an engine flywheel 40 (shown dotted) and consists of three identical die-castings 41 (two of which are shown in Fig. 4) each located against the flywheel by a pair of dowels 42 and secured by a pair of bolts 43 through lugs 44. Each die-casting 41 is a 120 degree sector of a base for the clutch body and at each end has a lug 45 for a pivot pin 46 for the levers 47 of the centrifugal masses 48 described later.

Between the flywheel 40 and the base of the clutch body formed by the three sectors 41 is the conventional driven part of the clutch, the center disc 49 carrying friction facings 50 one face of which is against the flywheel while against the other face is a presser plate 51. In each sector 41 is secured a driving stud 52 complementary to notches 51a in the presser plate whereby the presser plate can move towards or away from the flywheel but is constrained to rotate therewith. The studs 52 may also serve to center the presser plate relative to the axis of the flywheel.

On the outside of the clutch body is a spring plate 53 carrying locating discs 54 for clutch springs 55, the other ends of which are located in recesses 51b in the presser plate 51. The spring plate has three pairs of lugs 53a to which the inner ends of the levers 47 are pivotally attached at 56.

Mechanical clutch withdrawal is obtained by means of levers 57 cradled by their pivots 58 on lugs 59 on the face of the sectors 41, the inner ends of said levers being located in radial notches 60 in the face of a ring 61, which is secured to the ends of the levers by springs 62 which springs also act to urge the ring 61 to the right in Fig. 6. The outer ends of these levers 57 are bifurcated and engage washers 63 adjustably positioned by means of nuts 64 carried by studs 65 fixed in the presser plate 51.

Figure 8:
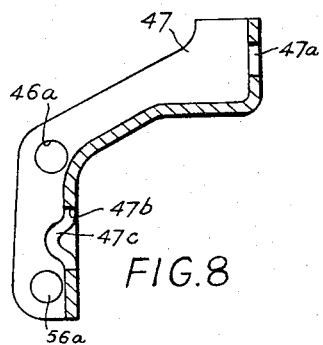
Figs. 7, 8 and 9 are front elevation, sectional side elevation and plan respectively of the centrifugal mass lever.
Figure 7:
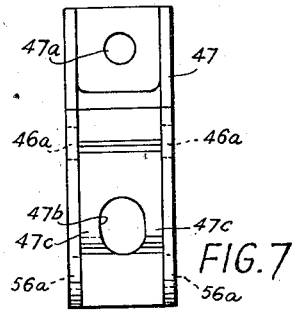
Figure 9:
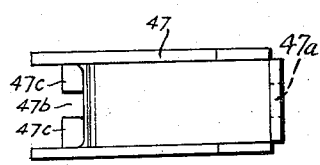
Figure 15:
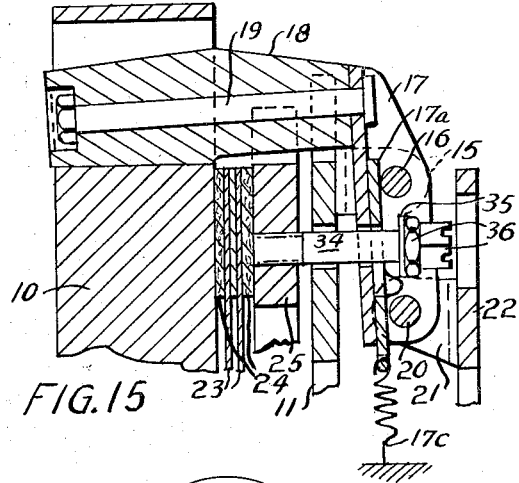
Fig. 15 is a view similar to that of Fig. 2 showing the fulcrum plate released from frictional contact with the collar.
Figure 11:
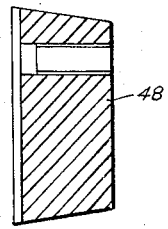
Figs. 10 and 11 are elevation and cross-sections of the centrifugal mass.
Figure 10:
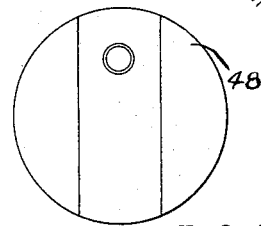

The centrifugal levers 47 are shown in more detail in Figs. 7, 8 and 9 and are channel-shaped welded pressings adapted at 47a to receive a fixing screw for the centrifugal mass and drilled at 46a and 56a for the pivots 46 and 56 aforesaid. Between such pivots the lever has an oval hole 47b on either side of which are formed fulcrum humps 47c. The centrifugal masses 48 are frusto-conical in shape and are secured to the ends of the levers and located in cylindrical holes 40a in the flywheel. The angle of the cones is such that when the masses are in their outermost position they can make line contact in the holes.

As can be seen, the masses 48 are at all times within the thickness of the flywheel to give maximum effective length to the levers and are positioned at each end of their movement by engaging the wall of the cylindrical hole 40a in the flywheel. Also when in their outermost positions it can be seen that the frusto-conical shape provides substantially line contact to give maximum accuracy of location. The cylindrical shape of the apertures and the round (frusto-conical) shape of the masses make for ease and accuracy of production and ultimate accuracy of balance in the assembly and clutch transmission.

The arrangement of the pivots 46 and 56 and of the humps 47c are such that the clutch springs 55 also act as clutch-withdrawal and hold-off springs in exactly the same manner as described for the first example herein. In the centrifugal operation of the clutch, there is no reaction point which is not a driving part of the clutch.

In operation the three sectors of the base, together with their centrifugal levers and weights, spring plate, presser plate, clutch withdrawal levers and ring can be assembled as a unit, fitted to a test flywheel, balanced and then delivered for fitting direct to the engine flywheel, each sector being separately located, by its two dowels and secured by two bolts.

Figure 12:
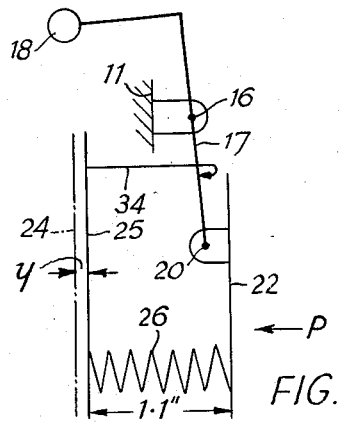
Fig. 12 is a diagrammatic showing of the principles underlying the present invention in which the flyweight is in inoperative or rest position.
Figure 13:
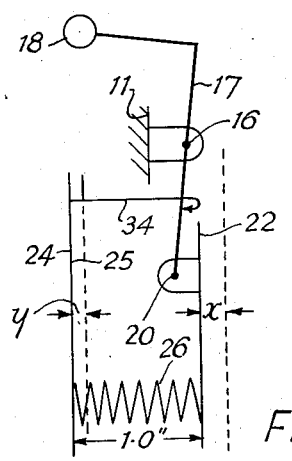
Fig. 13 is a view similar to that of Fig. 12 with the flyweight in such position that contact is made between the pressure plate and the clutch lining.
Figure 14:
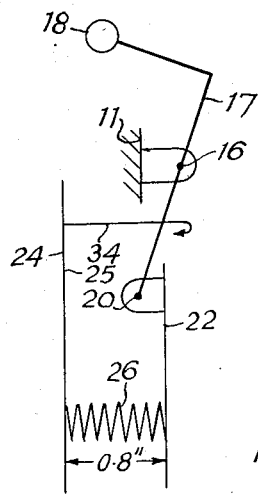
Fig. 14 is a view similar to those of Figs. 12 and 13, showing the clutch in operative position.

The diagrammatic showing of Figs. 12–14 illustrates the principles involved. In the operation, by referring to Fig. 12 is shown the relative position of the parts when the clutch is at rest with the presser plate 25 withdrawn a distance $y$ from the clutch plate 24. While the clutch is rotating, pressure in the direction of the arrow P is generated centrifugally by the weight 18, and when such pressure is great enough, i.e. at a predetermined speed of rotation, it tilts the lever 17 about the fixed pivot 16, moving the spring plate 22 to the left a distance $x$ (see Fig. 13). The presser plate 25 is also moved but for a shorter distance $y$ to engage the face of the clutch plate 24. The parts are now in the position shown in Fig. 13. The relative distance of movement $x$ and $y$ and the forces exerted as represented by P and the strength of the spring 26 are proportional to the distance of the point of engagement with the lever of the tie member 34 relative to the two pivots 16 and 20. As $x$ is greater than $y$, the spring 26 is compressed as shown here from its original length by a distance equal to $x-y$.

The force P to cause such movement is less than the strength of the spring since lever 17 is assisted by the spring through tie member 34 and fulcrum 17b. When the speed increases so that P is just greater than the strength of the spring, further movement of the lever 17 by the weight 18 occurs and moves the plate 22 still further to the left (Fig. 14) compressing the spring 26 still further. In this position, because the presser plate 25 is engaged with the clutch plate 24 and cannot also move, the lever 17 has moved away from the end of the tie member 34 (shown in all figures diagrammatically by an arrowhead).

As soon as the lever moves the spring plate 22 from its position in Fig. 13, the whole of the force P is applied to the presser plate 25 through the spring 26. Such final movement of the spring plate 22 is delayed while the pressure P builds up from the force required to reach the position B of Fig. 13 until it exceeds the compressed strength of the spring 26 and during such build-up it proportionally loads the clutch.

When the clutch slows down to the point at which P is no longer able to hold the spring compressed, without leverage advantage, spring 26 moves spring plate 22 to the right into the position of Fig. 13 and the lever 17 engages the tie member 34. The clutch is still substantially fully loaded but is progressively unloaded until the force P reaches its lower value for initial clutch engagement. As soon as the lever 17 engages the tie member 34 spring 36 operates to apply its force both to the right at the pivot 20 and to the left at the tie member 34 creating a force couple with a counter-clockwise direction about the fixed pivot 16, equal to $$\frac{P \times L}{2}$$

where L is the distance between the pivots 16 and 20 and assuming the contact at 34 is halfway between such pivots. Therefore, while the clutch is still slowing down, the unloading continues from the point of engagement of the contact at 34 but without further movement of spring plate 22 of lever 17 until the moment of the weight 18 equals the force couple aforesaid.

By reason of this force couple, as soon as it exceeds the moment of the weight 18 about the pivot 16, the force of the spring again starts to move spring plate 22 to the right away from presser plate 25 but this time also starts to move presser plate 25 in the same direction, but through a lesser distance to provide clutch clearance $y$. Spring 26 thus acts as a return spring for presser plate 25 only during this movement and, at the same time again moving back weight 18.

The invention is obviously not necessarily limited to the details above described which are given only by way of example. For instance levers 17 or 47 could be arranged so as themselves to engage springs 26 or 87 whereby the part engaging with the springs would be the spring compression means and a spring plate would be unnecessary.

I claim:

1. A centrifugal clutch comprising a fixed member, a first fulcrum on said fixed member, a lever on said first fulcrum, a centrifugally actuated weight connected to one end of said lever, a second fulcrum near the other end of said lever, an abutment member connected to said second fulcrum, a third fulcrum on said lever intermediate said first and second fulcrums, a presser plate having a tie member against which said third fulcrum bears, a friction plate adjacent said presser plate and adapted for engagement therewith, spring means between said abutment member and said presser plate whereby said spring means acts through said lever to load the tie member and withdraw the presser plate and to provide a holding-off force opposed to the clutch engaging force until the clutch engaging force is effective to unload the tie member and compress the spring means.

2. A centrifugal clutch according to claim 1 wherein said fixed plate is affixed to a flywheel.

3. A centrifugal clutch according to claim 1 in which said fixed member is composed of a plurality of sections, each located on and secured to a base member.

4. A centrifugal clutch according to claim 2 wherein movement limiting stops for said weights are provided within the flywheel.

5. A centrifugal clutch according to claim 4 wherein said stops comprise substantially circular apertures disposed in said flywheel around the periphery of said clutch, said weights being within said apertures and having a smaller circular cross-section than said apertures, and a tapered portion on said weights for complementary line contact with said apertures.

6. A centrifugal clutch according to claim 1 wherein said abutment member is part of said lever.

7. A centrifugal clutch according to claim 6 wherein said lever is in fulcrum abutment with the abutment member whereby a predetermined leverage ratio is obtained and maintained throughout the movement of said lever.

8. A centrifugal clutch according to claim 1 wherein there is provided a plurality of levers.

9. A centrifugal clutch according to claim 1 having means for rendering said third fulcrum temporarily inoperative whereby said spring means effects engagement while said clutch is stationary.

10. A centrifugal clutch according to claim 9 wherein said means for rendering the third fulcrum inoperative comprises at least one clutch withdrawal lever pivoted on said fixed plate, an actuating ring axially movable relative to said clutch and adapted to bear against one end of said withdrawal lever, a bearing surface near the other end of said withdrawal lever engaging said presser plate, said third fulcrum mounted on a fulcrum plate, said fulcrum plate being radially slidable with respect to said clutch, a plate spring urging said fulcrum plate toward the center of the clutch, whereby movement of said ring withdraws said presser plate and permits said fulcrum plate to slide said third fulcrum out of engagement with said lever.

11. A centrifugal clutch comprising a fixed member, a first fulcrum on said fixed member, a lever on said first fulcrum, a second fulcrum near the other end of said lever, an abutment member connected to said second fulcrum, means for applying a centrifugally generated clutch-engaging force to said abutment member, a third fulcrum on said lever intermediate said first and second fulcrums, a presser plate having a tie member against which said third fulcrum bears, a friction plate adjacent said presser plate and adapted for engagement therewith, spring means between said abutment member and said presser plate whereby said spring means acts through said lever to load the tie member and withdraw the presser plate and to provide a holding-off force opposed to the clutch engaging force until the clutch engaging force is effective to unload the tie member and compress the spring means.

References Cited in the file of this patent

UNITED STATES PATENTS

| | | |
|---|---|---|
| 2,045,557 | Almen et al. | June 23, 1936 |
| 2,191,846 | Carwardine | Feb. 27, 1940 |
| 2,195,354 | Bateman | Mar. 26, 1940 |
| 2,239,568 | Newton | Apr. 22, 1941 |
| 2,513,378 | Thelander | July 4, 1950 |
| 2,748,913 | Binder et al. | June 5, 1956 |

FOREIGN PATENTS

| | | |
|---|---|---|
| 546,795 | Great Britain | July 30, 1942 |